Jan. 28, 1930.  M. B. SKINNER  1,745,279
PIPE CLAMP
Filed Feb. 10, 1928
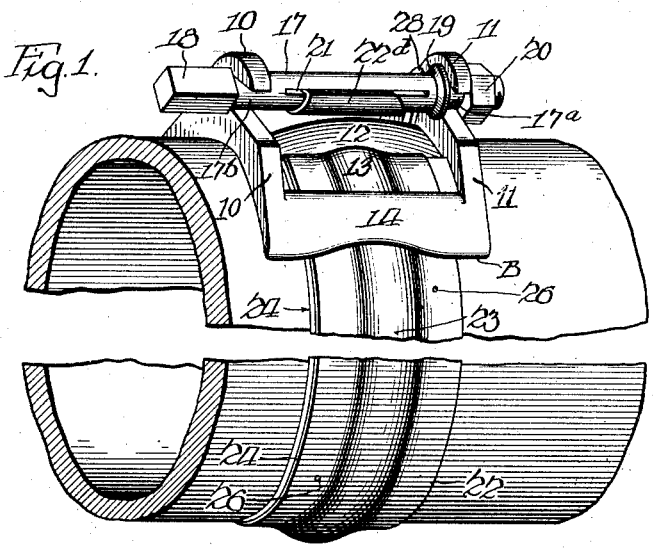
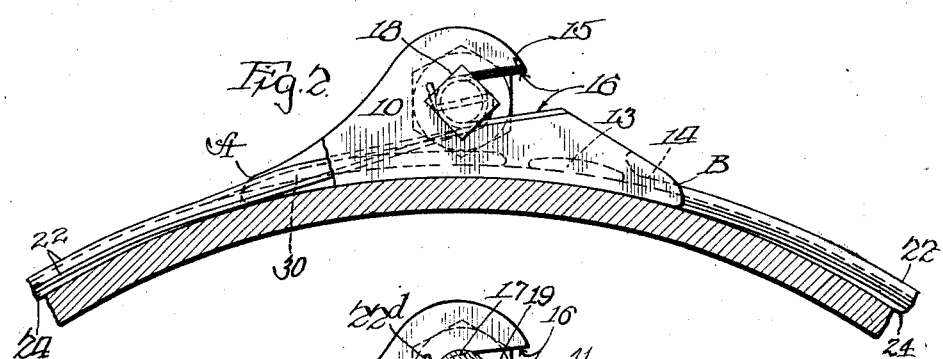
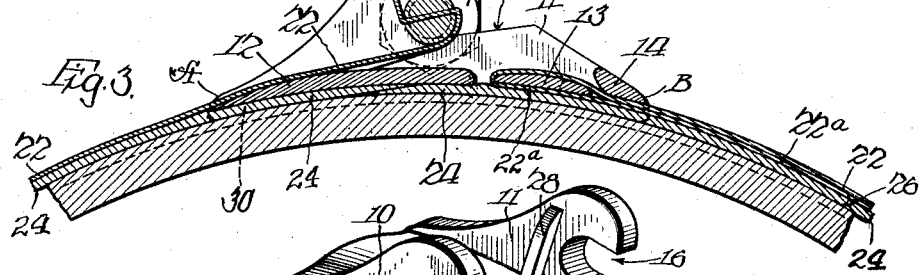
Inventor:
Mortimer B. Skinner
By Luther Johns
Atty.

Patented Jan. 28, 1930

1,745,279

UNITED STATES PATENT OFFICE

MORTIMER B. SKINNER, OF WILMETTE, ILLINOIS

PIPE CLAMP

Application filed February 10, 1928. Serial No. 253,241.

These improvements relate to what are known broadly as pipe clamps having for their object the provision of means for sealing a leak in such pipes as gas and water mains, steam pipes and the like.

So far as I am aware the present improvements bring into this pipe-sealing art for the first time the use of a flexible band as distinguished from rigid members clamped upon the pipe. It is not new broadly, however, to employ a flexible band wound upon a windlass or winding shaft for clamping pipes, as such devices have been employed heretofore in clamps for hose and similar flexible tubing where it was desired to secure parts together, for example such a flexible tubing to a rigid pipe. The purpose in such instances is to hold such cylindrical members one upon the other, while in the present improvements the object is to seal a leaky joint or a break in the pipe. The present improvements will find their chief application in pipes of large diameter ranging up to forty inches or more; and in this connection an important object of the improvements is to provide a form of clamp which is readily adjustable within wide ranges to pipes of different sizes.

The present improvements provide an unusually advantageous emergency device in the ease and celerity with which it may be applied, as well as in the small space required for applying it. For example, where there is a break or leakage in a gas main, after the workmen have excavated so as to expose the pipe at the leak the present band clamp may be applied with much less excavation than would be required according to prior sealing clamps used for the same purpose, and in a much shorter time; and this feature is peculiarly important where it becomes necessary to shut off the gas, steam or other fluid while repairs are being made.

Another object and feature of important advantage arises from the peculiar adaptability of the present structure to pipes which have been welded and which contain circumferentially at the weld a mass in the form of a rib of weld material. Leaks are peculiarly prone to develop at such welded joints, and I am not aware that heretofore there has been a clamp particularly advantageous to such situations. The present invention was made with these welded pipes primarily in view, but it is applicable to other situations as well.

Other objects and advantages will appear hereinafter.

In the drawings Figure 1 shows the device upon a pipe;

Fig. 2 shows the same structure, on an enlarged scale, in side view;

Fig. 3 is a medial perspective through the device looking in the same direction as in Fig. 2; and Fig. 4 is a perspective of the frame.

Turning first to Fig. 4, the frame comprises a pair of side members 10 and 11 and cross members 12, 13 and 14. The cross member 12 is a sheet-like part extending roughly about two-thirds of the circumferential length of the frame. The relation of these crosspieces to each other is well shown in Fig. 3 from which it will be noted that there is a slight overlap between the crosspieces 13 and 14 with an intervening space, and that the adjacent edges of crosspieces 12 and 13 are spaced apart. The frame complete is an integral casting of metal, usually bronze, in my practice and is a strong and rigid structure.

The side member 10 has a slot-like opening 15 therein while the side member 11 has a similar but narrower slot-like opening 16 therein, and, as will be noted from Figs. 2 and 3 these slot-like openings may be said to extend substantially tangentially to the pipe when the frame is normally seated thereon. These openings 15 and 16 serve as bearings for end portions of the windlass or winding shaft 17. The bearing 17$^a$ of the shaft is smaller than bearing 17$^b$, and since these bearings fit their respective slots there is no possibility of assembling the shaft with the frame in an improper way. The shaft has a square portion at 18 for turning or rotating it. It has also a collar 19 adapted to bear against the inner surface of the side member 11, while the free end of the shaft adjacent to the collar is threaded and a nut 20 binds the side member 11 between the nut and the collar 19, thus holding the shaft tightly when turned the desired amount. In this connection it may be observed that when the threads on the shaft are right-hand threads, in the arrangement shown, any tendency of the shaft to turn in a direction reverse to the winding direction tends to increase the clamping action by threading the shaft more tightly into the nut. The shaft has a strip-receiving slot 21 between its end portions and between the side members 10 and 11 to accommodate the end of the flexible band 22. The shaft is a strong element made of steel.

The band 22 is of strong and flexible metal, and in my practice it is what is known as soft or annealed brass. "Dead soft" is a description of it frequently used. Its soft character enables it to conform excellently to the surface upon which it is bound.

Referring to the important application of the device to welded pipes, Fig. 1 shows an annular enlargement or rib 23 in the band 22, the band having been drawn tightly upon and encompassing a corresponding rib or enlargement at the welded joint of the pipe. This figure shows that the band has conformed to that rib or enlargement through stretching strains. It is clear that an unusually tight and close-fitting binding element is thus provided for situations where there are such ribs or other irregularities in the outer surface of the pipe.

A strip of gasket material 24, such as soft rubber or fabric treated with rubber compound, underlies the band and is the first covering for the pipe where it is to be sealed. Such a gasket as 24 may completely encircle the pipe and have its ends overlap as at 25, Fig. 3, or the gasket 24 may cover only the particular area where the sealing is at the time called for. Fig. 2 shows the frame or saddle as resting directly upon the pipe and with the gasket terminating short of the frame. In the appended claims where the frame is described as seating upon the outside of a pipe I intend that terminology to include instances where the gasket may be between the frame and the pipe, the terminology in that respect being intended to describe the general location and arrangement rather than actual contact.

Fig. 3 shows the strip, web or band 22 as folded over upon itself and around the crosspiece 13 with the free end portion 22ª under the outer stretch 22, the outer stretch passing under the crosspeice 14, and having its direction changed somewhat thereby. The arrangement of the crosspieces 13 and 14 is such that the band is anchored close to the pipe surface and by the simple expedient of passing the free end portion of the strip between the crosspieces 13 and 14, extending it through the opening between the crosspieces 12 and 13 and then folding it back upon itself. When pressure comes upon the band the end part 22ª is clamped by the outer stretch of the material and the form and arrangement of the crosspieces 13 and 14 are such as to provide such an anchor that the band will not slip when the strains are brought to bear upon it.

The workman approaches the job with the strip 22 held upon the crosspiece 13 as shown by Fig. 3. He may hold in his hands at the same time the gasket strip extending lengthwise on the inner surface of the binding strip, or the gasket may be secured to the outer strip 22 as by several small rivets as 26, the gasket being so attached merely for convenience in application. The other end of the band is inserted in the slot of the shaft and made secure therein as at 22ᵈ of Fig. 3. The frame is then placed upon the pipe and the band with shaft attached is passed around it. The shaft is then applied to the frame by inserting its bearings in the slots 15 and 16. A feature of importance in this connection is that the band may be preliminarily adjusted to the diameter of the pipe by folding more or less of the band around the crosspiece 13. The parts being thus assembled on the pipe the shaft is then turned to wind the strip 22 upon it, and in this connection it is mentioned that considerable force may be applied in this winding operation since the band is a very strong element, being of say twenty-gauge material and ordinarily from three to four inches wide. The operator senses the give and yield due to stretching of the brass and continues to apply the tightening strains until he has stretched the material sufficiently to bring about the desired conformation of it to the ridge or other irregularity in the pipe, and has stiffened the material through the stretching operation to a degree where further tightening is practically impossible, or at least until further tightening is not necessary. The nut 20 is then tightened, locking the shaft.

The cross members 12, 13 and 14 are formed concave medially on their under surfaces in the circumferential direction of the pipe to accommodate the rib in the welded pipe. The space at 30, Fig. 3, shows this hollow.

The shaft is shown as being positioned substantially midway between the ends A and B of the frame, and the distance between these ends A and B is materially great, and particularly the distance from A to the shaft is materially great. The frame is so formed for a very special reason, namely, to provide leverage action of such kind and character as will maintain the frame strongly and firmly seated during the tightening operation. When the shaft is turned in the anti-clockwise direction as viewed in Fig. 3 the end A becomes a fulcrum on which the frame as a whole tends to rock upward. Since the distance from the shaft to the edge A is materially great, say three inches in a size of clamp suitable for twelve-inch to forty-inch diameter pipes, the fulcrum at A is so far from the shaft that this tendency of the end B to rise is substantially eliminated. Then, too, since the crosspiece 13 is at a substantially great distance from the shaft the tightening strains have the effect of maintaining the end B down, meaning against the pipe. If the end B were permitted to swing upward or away from the pipe during the tightening operation the spring-back or back-lash when these strains are discontinued would cause looseness in the band. The object of this particular construction is therefore to maintain the frame or buckle against such tilting action so as to maintain the tight fit of the band upon the pipe when the winding strains are discontinued and the shaft is locked.

The band 22 approaches the shaft between the side members 10 and 11. The integral guide 28, Fig. 4, maintains the strip 22 against creeping or climbing upon the collar 19.

The device as thus constructed is of few parts, quite simple, relatively cheap, of unusual efficiency and peculiarly easy to apply with the speed desired in emergency-clamp work.

I contemplate as being included in these improvements all such changes, variations and departures from what is thus specifically illustrated and described as fall within the scope of the appended claims.

I claim:

1. A pipe clamp of the character described comprising a frame having spaced-apart side members and being formed to seat upon the outside of a pipe, each side member having a slot-like opening therein to receive readily and to provide a bearing for an end portion of a winding shaft, a winding shaft having a slot for a clamping band between its end portions and having its end portions in said openings respectively, means for holding to the frame one end portion of a flexible clamping band adapted to encompass the pipe, a flexible band so held, the other end portion of said band extending into the slot of the shaft, the shaft having means for rotating it and means for locking it.

2. The combination of claim 1 hereof in which the frame is formed to provide on its normally under surface space to accommodate a circumferentially directed mass of welding metal on the pipe at the joint therein to be sealed.

3. The combination of claim 1 hereof in which the slot-like openings in the frame side members respectively extend so as substantially to fit upon the pipe and in opposite directions from the locality of the shaft when the clamp is normally on the pipe.

4. The combination of claim 1 hereof in which the bearing portion of one end of the shaft is of smaller diameter than the bearing portion of the other end thereof, and the slot-like opening of one of the side members is of sufficiently less width than that of the other to provide that the shaft may be assembled with the frame in only one way.

5. The combination of claim 1 hereof in which said shaft has a flange-like collar adapted to bear against the inner surface of one of the side members and the free end of the shaft adjacent thereto is threaded and a nut is on said threaded end to clamp the shaft tightly upon the side member, there being guide means carried by the side member to guide the band out of climbing association with said flange when the band is being wound on the shaft.

6. The combination of claim 1 hereof in which said flexible band is of soft sheet metal which will stretch under the tightening strains.

7. A band clamp of the character described for sealing a leak in a pipe, comprising a frame, a winding shaft carried operatively thereby, the shaft having means for holding thereto one end portion of a strip of sheet metal for winding thereon, the frame having means for holding securely thereto the other end of such strip, a strip of sheet metal adapted to encompass the pipe and having one end secured to the frame and its other end adapted to be held by the shaft, and a gasket of sealing material on the inner surface of said strip.

8. The combination of claim 7 hereof in which said strip is of soft brass.

9. The combination of claim 7 hereof in which said strip is of soft sheet metal and the frame has means for the ready operative application thereto of the shaft when the strip is operatively secured to the shaft.

MORTIMER B. SKINNER.